July 7, 1970
J. A. DOBRINEN
3,519,050
MELON BALL CUTTING MACHINE
Original Filed Oct. 30, 1964
9 Sheets-Sheet 1
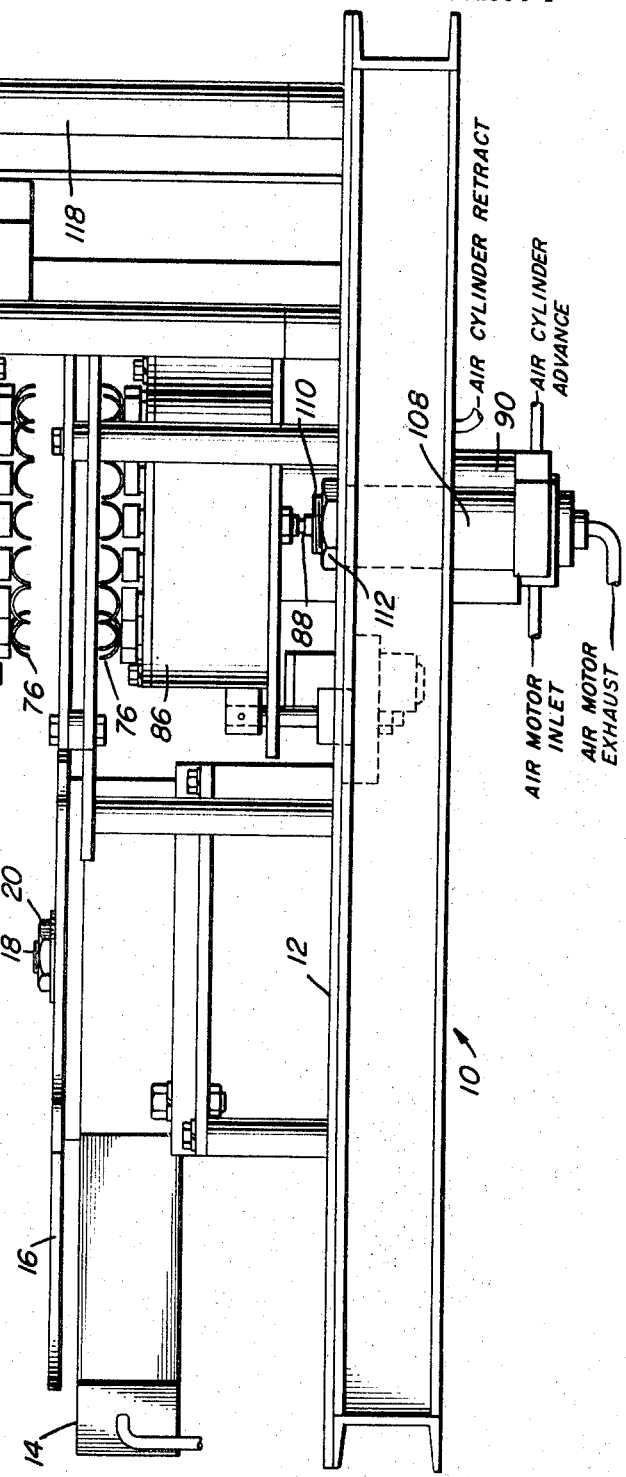
Fig. 1
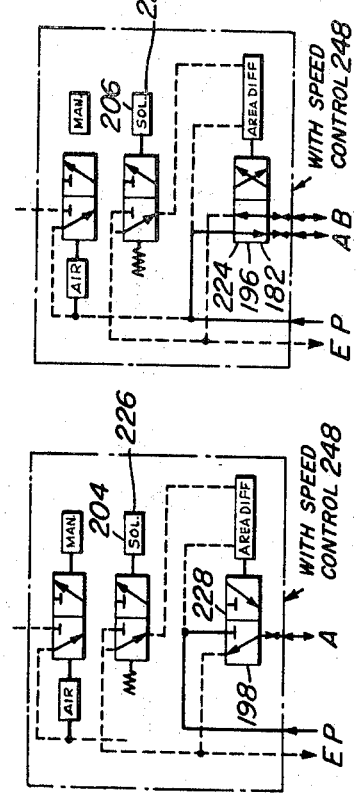
Fig. 19
Fig. 18
INVENTOR
Jacob A. Dobrinen
BY
ATTORNEY July 7, 1970 J. A. DOBRINEN 3,519,050
MELON BALL CUTTING MACHINE
Original Filed Oct. 30, 1964 9 Sheets-Sheet 2
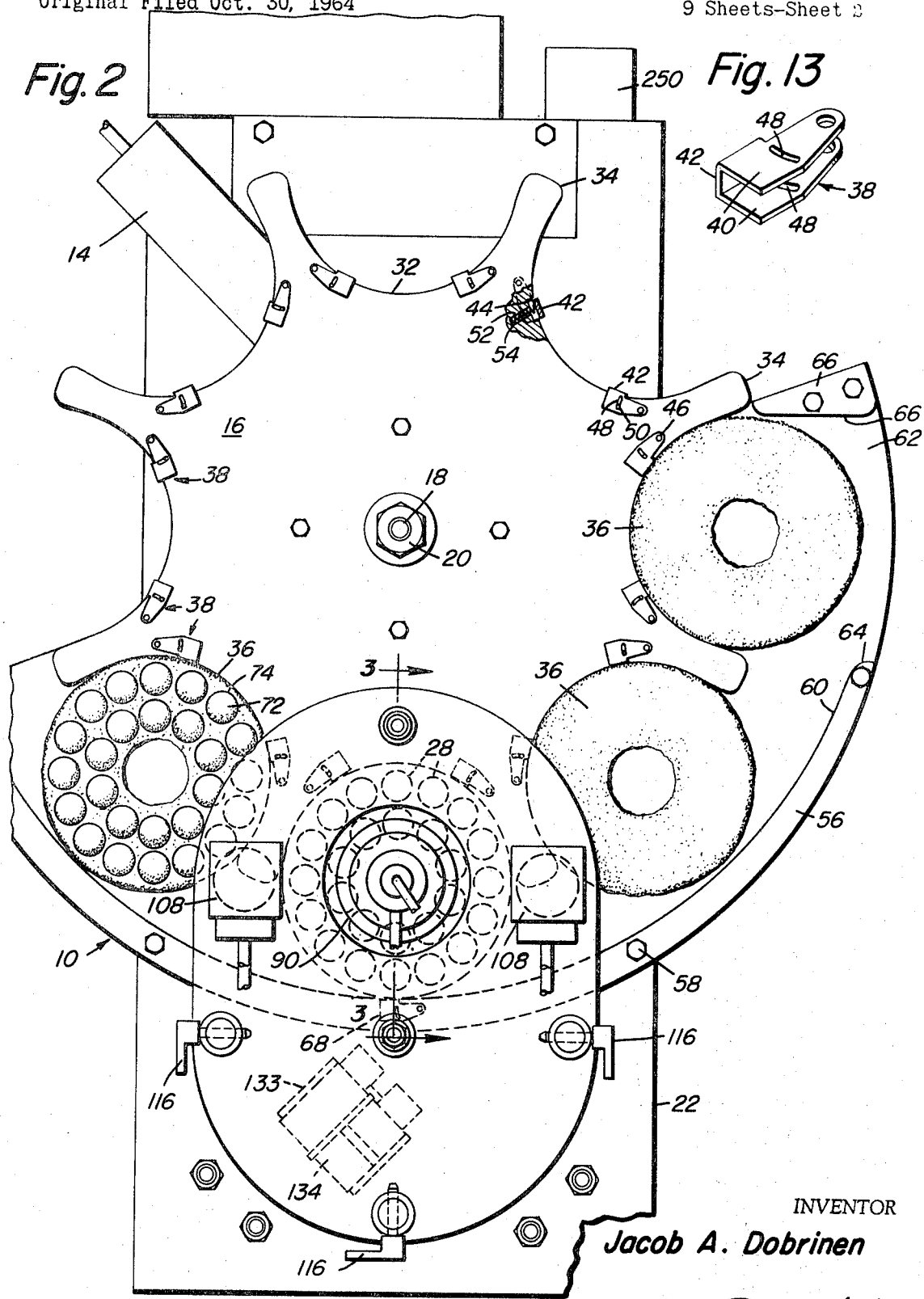
INVENTOR
Jacob A. Dobrinen
BY Tristan Miller
ATTORNEY July 7, 1970  J. A. DOBRINEN  3,519,050
MELON BALL CUTTING MACHINE
Original Filed Oct. 30, 1964  9 Sheets-Sheet 3

INVENTOR
Jacob A. Dobrinen
BY
ATTORNEY

July 7, 1970     J. A. DOBRINEN     3,519,050

MELON BALL CUTTING MACHINE

Original Filed Oct. 30, 1964     9 Sheets-Sheet 4

INVENTOR
Jacob A. Dobrinen

BY
Gustave Miller
ATTORNEY

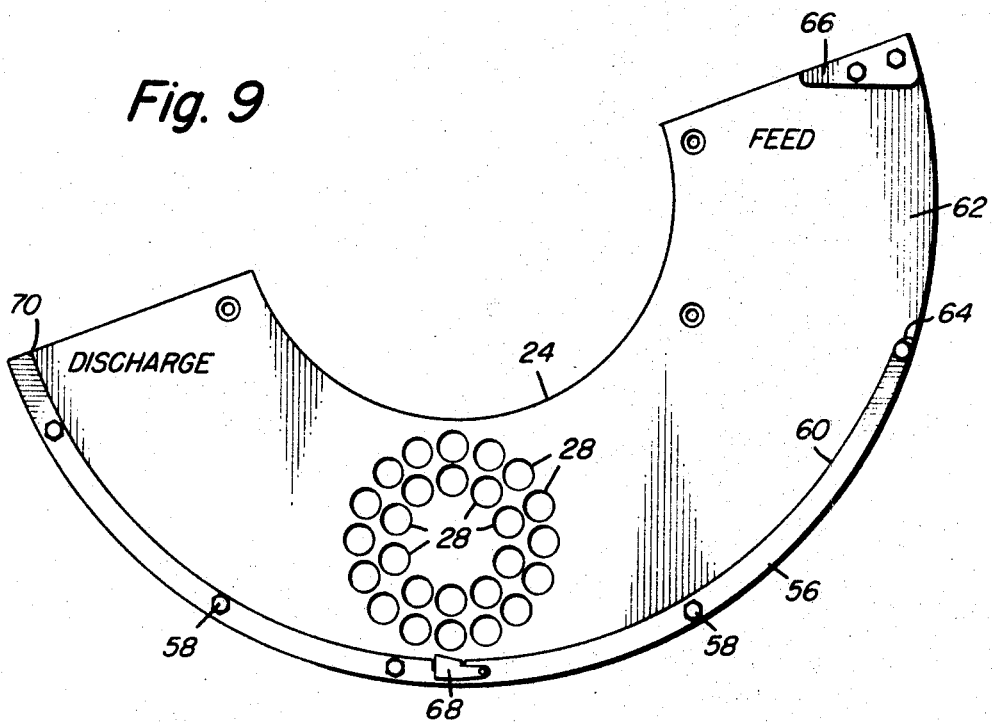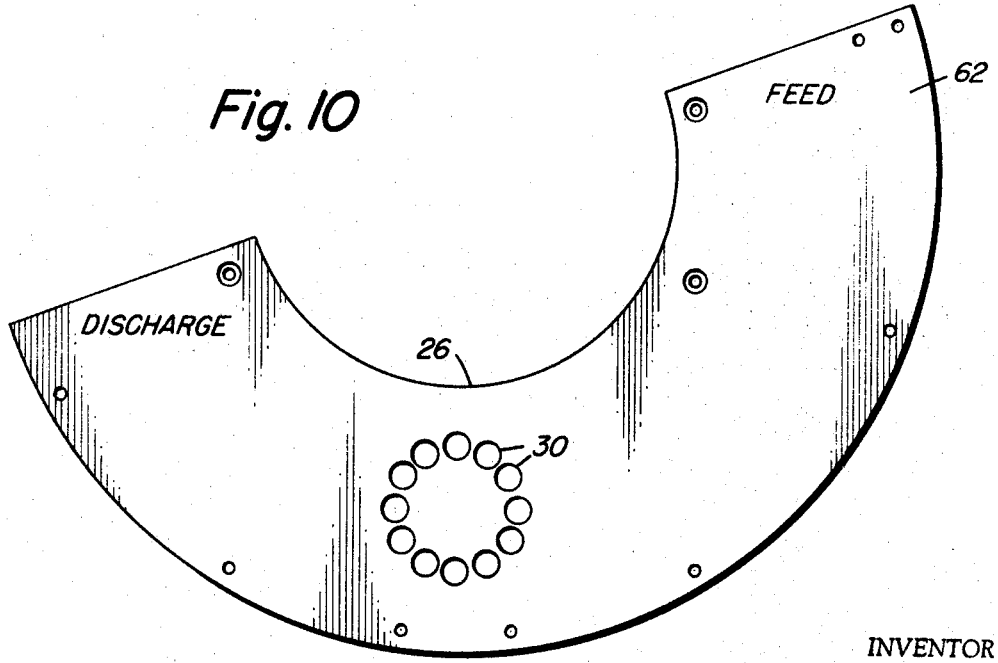

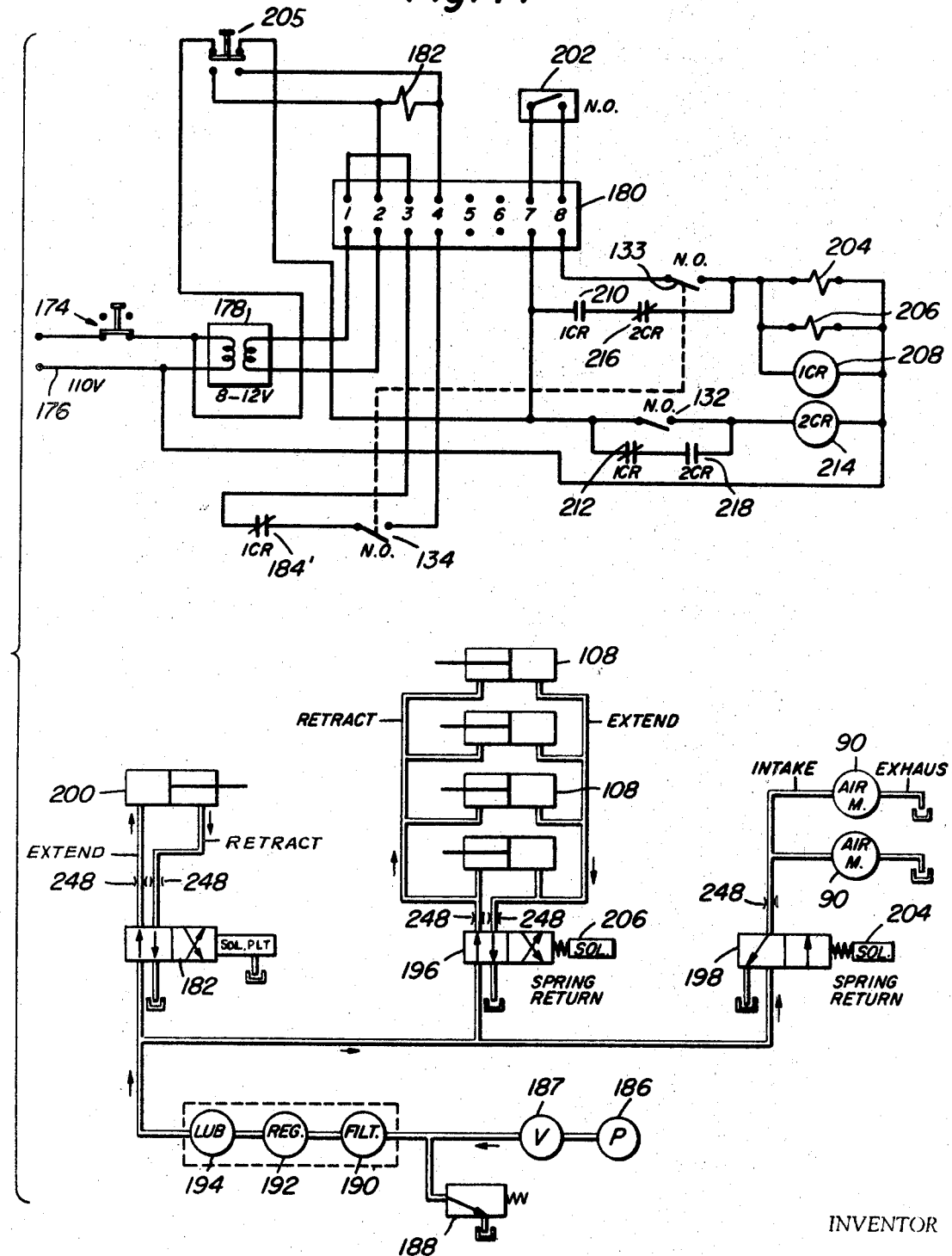

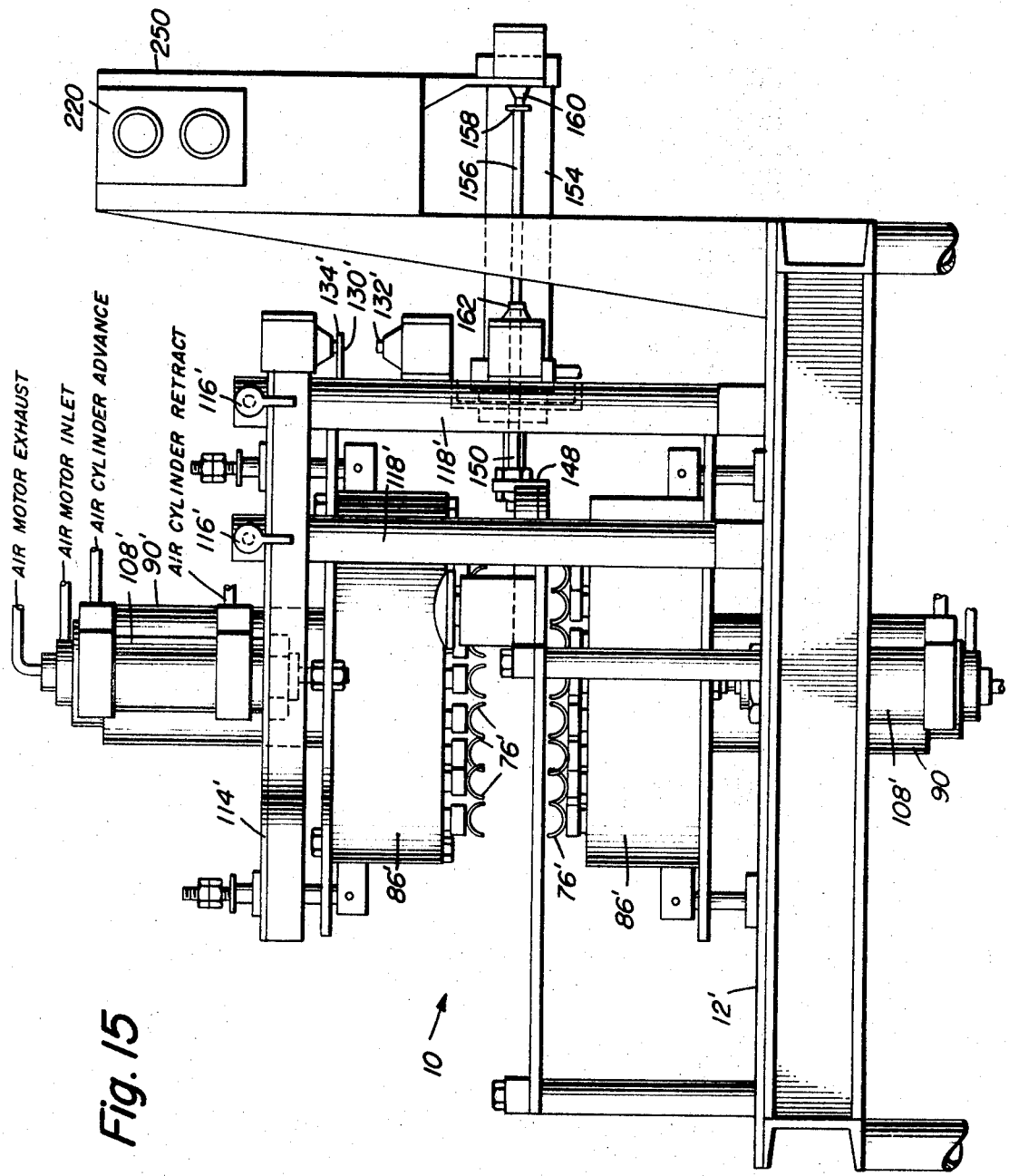

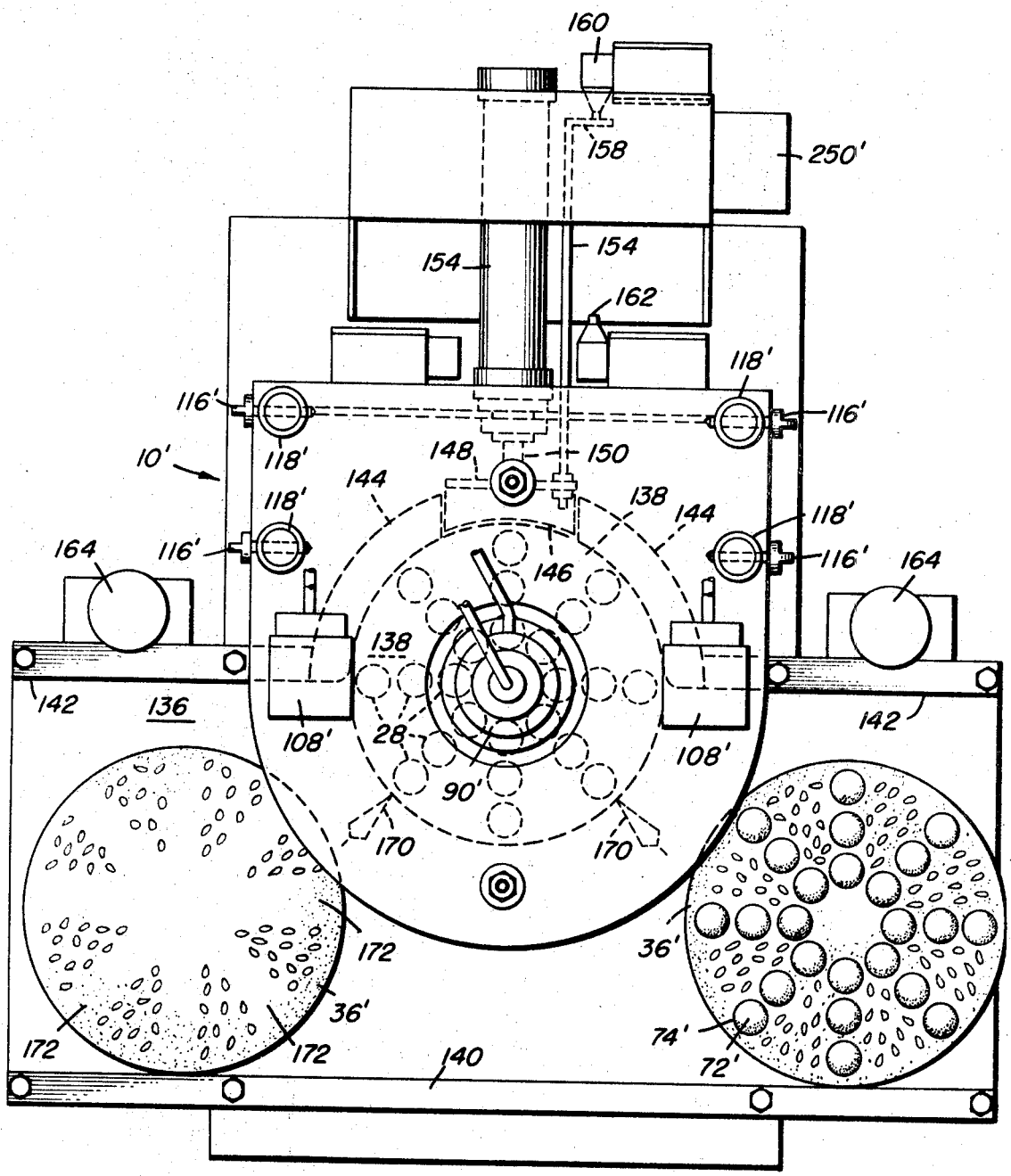

July 7, 1970     J. A. DOBRINEN     3,519,050

MELON BALL CUTTING MACHINE

Original Filed Oct. 30, 1964     9 Sheets-Sheet 9

INVENTOR
Jacob A. Dobrinen

United States Patent Office 3,519,050
Patented July 7, 1970

3,519,050
MELON BALL CUTTING MACHINE
Jacob A. Dobrinen, Wheatland, Calif., assignor of one-fifth to Gustave Miller, Washington, D.C.
Continuation of application Ser. No. 407,773, Oct. 30, 1964. This application Sept. 4, 1969, Ser. No. 855,800
Int. Cl. B26d 3/26, 5/04, 1/44
U.S. Cl. 146—106    26 Claims

ABSTRACT OF THE DISCLOSURE

A machine is provided for cutting melon balls from a slice of melon or the like. A slice is placed into a scallop of a star plate intermittently rotating over a table. Upper and lower semispherical rotating blades are pneumatically operated so as to come substantially together at a cutting station to cut out balls in the slice except for a very slight web. The blades are withdrawn from the slice, the plate is indexed and upon reaching a discharge station, the balled slice is manually removed whereupon the balls may be easily removed by shaking.

This application is a streamlined continuation-in-full of application Ser. No. 407,773 filed Oct. 30, 1964, now abandoned.

This invention relates to a ball cutting machine, and has for an object to provide an improved machine for simultaneously cutting a maximum number of balls simultaneously from a disk or ring of material.

A further object of this invention is particularly in the field of cutting food balls from a sliced disk of the food involved, particularly such as cantaloupes, honeydew melons, watermelons, and other foods which are capable of being sliced into appropriate disk or ring sections.

Still a further object of this invention is to provide a melon ball cutting machine which will automatically cut a maximum number of melon balls simultaneously from a sliced ring or disk of melon, and which will do it faster than any other machine or manual method.

Still a further object of this invention is to provide a power machine, powered by a power supply other than manual, for doing the cutting operation of the melon balls from a melon disk or ring.

Still a further object of this invention is to provide a melon ball cutting machine which is pneumatically powered.

Yet a further object of this machine is to provide a melon ball cutting machine wherein the pneumatic power thereof is electrically controlled to provide automatic or semiautomatic operation thereof in a proper sequence.

Yet a further object of this invention is to use a constant torque power source for operating a plurality of ball cutting blades simultaneously, wherein the speed of operation may be adjusted as necessary according to the degree of firmness of the melon ring or disk from which the balls are cut.

Still a further object of this invention is to provide a melon ball cutting machine wherein a plurality of cutting blades are provided in opposed pairs for rotation in the same direction, wherein electrically controlled pneumatic means is provided for advancing the blades toward each other and then retracting them, wherein means is provided for stopping the blades of each pair slightly short of contact with each other to thus leave a web of the melon holding each ball in the slice with the cut ball still held in the slice until it is removed from the machine of this invention.

Still a further object of the invention is to provide an improved ball cutting blade and an improved method of forming the ball cutting blade in mirror image pairs from the same template or die.

Still a further object of this invention is to provide an improved ball cutting blade that is substantially semi-spherical in shape, and is used in pairs, with the blades of the pair rotating in the same direction in opposed relation to each other.

A further object of this invention is to provide a melon ball cutting machine that cuts melon balls from slices of the melon, in the form of a ring or a disk, as contrasted with the usual manner of cutting melon balls from a half of a melon.

In brief, this invention consists of a machine for automatically or semi-automatically and simultaneously cutting a maximum number of melon balls from a slice of melon by providing a table whereon the melon slice is supported over a pattern of holes corresponding to the number of balls that are to be cut simultaneously, supporting a pair of electrically activated, pneumatic powered rotary motors of conventional construction, one above the table, the other below the table, providing a gear train for each motor and a set of ball cutting blades on shafts operatively connected to each gear train, with the blades extending toward each other in opposed pairs of blades rotating in the same direction, providing a pair of conventional air cylinders for each of the two motors to advance and retract the motors and their blades toward and away from each other through a slice of melon supported on the table over the pattern of holes, the lower set of blades advancing and retracting through the pattern of holes, and providing both a pneumatic circuit for the motors and air cylinders, and an electrical circuit for causing the cutting blade motor to operate while being advanced by the air cylinders and stop operating while being retracted to permit a new slice to be placed in position.

In the case of a watermelon slice, the slice is placed manually in position, and then partially ejected from the cutting position so that it may be readily manually removed so that a new slice may be placed therein, the circuit for initiating the activation of the motors and air cylinders requiring the use of two hands to keep them safely out of the way of the rotating blades. In the case of a slice of honeydew melon, cantaloupe or other similar type of melon, in addition, a rotary feed star shaped plate is provided, which is rotated by a conventional pneumatically operated rotary feed table, in cooperation with a guide fence to advance the slices to cutting position, and then remove them therefrom, the slices being manually inserted in and removed from the star shaped plate. The cutting blades are stopped slightly short of each other, so that the balls are still held by a web of melon in position until the slices are removed and then shaken, either manually or by any conventional means, not part of this invention, to remope the balls therefrom. The pneumatic or air motors are of constant torque, and have conventional means for varying their speed, the speed variation being done according to the firmness of the slice. A number of machines will be provided for each operator, and then slices supplied him will be graded for size and firmness, and each machine will operate on slices within certain size limits, other machines being provided for other sizes of slices, thus greatly increasing the productivity of each operator. The machines are provided with electrical controls and limit stops for valving the pneumatic pressure in a proper sequence to the various motors and air cylinders to provide a continuously repeating cycle of operation for cantaloupe and honeydew melon machines, needing only manual feeding and removal of the slices to the star shaped plate, while in the case of the watermelon slices, the slices must be manually placed and indexed into cutting position, the operator initiates the operation after placing a slice in position, and then may turn to another machine and do likewise while the first machine goes through its cycle until the sleeve is automatically ejected and is ready for removal. Obviously several machines may be thus tended by a single operator.

With the above and related objects in view, this invention consists in the details of construction and combination of parts, as will be more fully understood from the following description, when read in conjunction with the accompanying drawings, in which:

FIG. 1 is a side elevational view of the complete automatic machine for cutting melon balls from honeydew melons and the like.

FIG. 2 is a top plan view of the machine of FIG. 1.

FIG. 9 is a detail view of the feed table plate as used in FIGS. 1 and 2, and including the guide fence and cheek.

FIG. 10 is a similar view of the feed table plate per se used with the cutter assembly of FIGS. 5 and 6.

FIG. 13 is a perspective view of one of the slice centering clips used on the star wheel and guide fence.

FIG. 14 is an electric and a pneumatic diagram for the honeydew melon type of ball cutting machine.

FIG. 15 is a side elevational view of the semi-automatic watermelon ball cutting machine.

FIG. 16 is a top plan view of the watermelon machine of FIG. 15.

FIG. 18 is a diagram of a 2-way solenoid valve.

FIG. 19 is a diagram of a 4-way solenoid valve.

Figure 3:
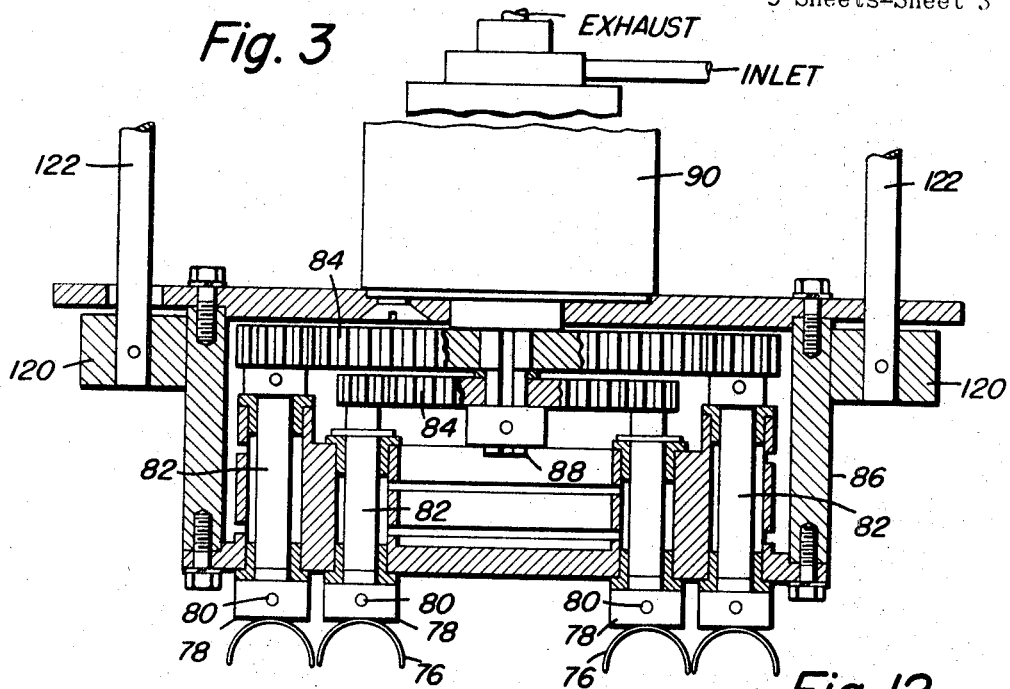
FIG. 3 is a vertical section on line 3—3 of FIG. 2 of the cutter assembly.
Figure 12:
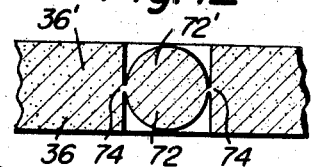
FIG. 12 is a sectional view of a cut melon ball still in the slice.

There is shown at 10 the melon ball cutting machine of this invention supported on and partly through a base 12 which in turn is suitably supported on a bench or on legs at a convenient height for an operator. Fixedly supported on this base 12 is a commercial rotary work feed table 14 which intermittently rotates a star shaped wheel 16 mounted thereon on rotary feed table shaft 18 and secured thereto by a nut 20. Extending over and beyond the rotary feed table mechanism (not shown) is a fixedly mounted horizontally disposed table 22. Mounted on this table 22 is a semicircular feed plate 24 (shown in FIG. 9) or 26 (shown in FIG. 10); feed plate 24 having a double annuli pattern of twenty-six indexed ball cutter receiving holes 28, and feed plate 26 having a single annulus pattern of twelve similar holes 30.

It will be understood that the machine 10 will be set up for a selected one of a certain range of sizes for different diameters of melon slices, this style of machine 10 being intended for melons such as honeydews and cantaloupes, which are sliced, usually about one and one eighth inches thick, and graded by one half inch increments by any conventional means, manually or mechanically and washed or sprayed to be free of any seeds and loose pulp. A different machine 10 will be provided for each different range of sizes, the sizes running normally from eight inches diameter down to about four and one half inches diameter. The larger size slices will be used on a machine with feed plate 24 and double annuli pattern 28, and the smaller size slices will be used on a machine with feed plate 26 and single annulus pattern 30. Obviously, the sizes can be made to fit any diameter required.

The star shaped wheel, or star wheel 16 is controlled in its rotation by rotary work feed table 14 to make eight intermediate stops per complete revolution, and is provided with eight concave melon slices receiving concavities or recesses 32 between each adjacent pair of its eight star points 34, so that a melon slice 36, in the shape of a ring when it is a honeydew or cantaloupe slice, may be fed thereto by any convenient means, such as manually, by conveyer, by gravity chutes, or any other way, not forming part of this invention.

Pivotally mounted in each star wheel recess 32 in spaced apart relation is a pair of ejecting and centering clips 38, shown in FIG. 13. Each clip consists of a pair of somewhat triangular shaped parallel fingers 40 integrally connected by a web 42, so that the web 42 and fingers 40 form a U. The star wheel recesses are provided with a pair of countersinks 44 for each web 42, and the fingers 40 are pivoted by a pin 46 through the end of each finger 40, the other ends of the fingers 40 being provided with a slot 48 to cooperate with a fixed pin 50 limiting the outward movement of the clip 38 under the bias of spring 52 countersunk in a hole 54 urging the clip outward, the hole 52 extending into countersink 44. There are two spaced apart clips 38 in each recess 32.

Cooperating with the star wheel 16 for holding the slices 36 in the recesses 32 is a curved guide fence 56 secured on the horizontal table 24 by studs or the like 58, the curved guide fence 56 being concentric with the center of the star wheel 16 and spaced from the recesses 32 so that the maximum diameter slice 36 received therein will be held snugly in such recess 32 by the fence 56 and urged toward the fence 56 by the clips 38. The entrance end 60 of guide fence 56 is tapered as shown, on its inner side, so as to urge the slice 36 into the recess 32 as it passes thereby after being fed through the feed throat 62 formed by the extreme end 64 of tapered guide fence end 58 and a guide cheek 66 secured on the entrance end of the feed plate 24 or 26. A spring biased clip 68, identical in construction and operation with the clips 38 in each recess 32, is mounted on the inner edge in a similar countersink on the guide fence 56 exactly in line with a radial line extending from the center of star wheel 16 coinciding with a diameter through the pattern of holes 28 or 30 when the star wheel is stopped to hold a slice 36 at the ball cutting station. This clip 68, and the two clips 38 cooperate to center and steady the slice 36 during the cutting operation, and when the cut slice 36 reaches the discharge end of the feed plate 24, at the discharge end 70 of fence 56, the clips 38 provide somewhat of an ejecting push to the cut slice 36 toward a suitably located receiving conveyer, chute, table or the like extending thereto (not shown).

When the slice 36 is held in the cutting station over the pattern of holes 28 or 30, melon balls 72 are cut or formed therein, but are left secured therein by a connecting web 74 of melon pulp, so that the balls 72 will remain with the slice 36 until the slice 36 has been removed from the discharge end and then the balls 72 are shaken out from the slice manually or mechanically by any convenient means (not shown). Each ball 72 is formed by a somewhat semispherical mirror image pair of opposed, slightly spaced apart cutting blades 76 rotating in the same direction. Each blade 76 is secured about the center 94 of its back to a cap 78 which is detachably secured by a diametrically extending pin 80 which also extends through the end of a shaft 82 whose other end extends into mesh with a gear train 84 within a gear housing or cutter head 86, the gear train 84 being geared to a rotary shaft 88 of a commercial pneumatic or air motor 90.

Figure 7:
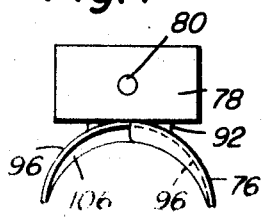
FIG. 7 is an enlarged side elevational view of a cutter blade.
Figure 8:
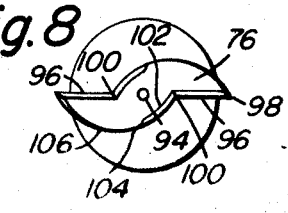
FIG. 8 is a bottom plan view of FIG. 7.

As will be noted in FIGS. 7 and 8 particularly, the melon ball cutting or forming blade 76 is secured to its cap 78 by any convenient means such as spot welding 92 with its center pivoting point 94 coinciding with the axial center of the cylindrical cap 78 and thus the axial center of the geared rotary blade shaft 82. Each blade 76 has two diametrically aligned cutting edges 96 which appear straight in plan view but are actually circular in edge view, these edges extending from outer points 98 to inner ends 100 where they merge with a cutting edge 102 that is curved in plan view as well as in edge view, this sharp curved cutting edge 102 extending to a point 104 which is at least at and possibly somewhat beyond the foremost cutting area of the blade 76 as it rotates clockwise (as viewed in FIG. 8) the curved continuation 106 of the blade 76 outward toward the blade points 98 not being sharp, as such edge does not do any cutting. Thus, it is only those parts of the edges that advance during rotation that are necessarily sharp, and it is immaterial whether the other parts of the edge are sharp or dull.

One set of blades 76 are operated by one pneumatic motor 90 from above the melon slice 36, the other set of blades are operated by another pneumatic motor 90 below the melon slice 36, and the set of blades 76 from the lower pneumatic motor 90 are raised toward the blades of the upper set through the holes 28 or 30, it being understood of course that the sets of blades 76 are provided in a pattern corresponding to the pattern of holes 28 or 30. Each blade 76 of the upper set is paired with a blade 76 of the lower set, and the opposed blades of each pair are always rotated in the same direction, so that the melon balls 72 are not torn from their slices 36 but remain held therein by their webs 74 after the slices 36 are discharged from the cutting machine. Means hereinafter described are provided for advancing the motors 90 toward each other, while rotating the blades, and stopping the advance when the blades are still slightly spaced from each other, to then retract them while leaving the balls 72 held in the webs 74 left when the blades stay spaced apart, the rotation of the blades being stopped while the blades are retracting, and then while the blades are retracted, the rotary feed table is activated to rotate the next slice 36 into cutting position.

The opposed blades 76 of each pair are mirror images of each other, and formed from the same template. One preferred form of making the template and thus the blades is to wrap a piece of soft, inelastic, malleable ductile metal, such as lead, about one sixteenth inch thick around one half of a hard metal ball, such as a one and one eighth inch diameter steel ball bearing. Then following the ball contour, and cutting with a sharp knife, a pattern is established for the blade 76. Next, the lead is straightened out and a circle template is used in order to determine a true radius. After establishing set dimensions, a flat pattern is made on a piece of aluminum approximately one thirty second inch thick, using the established dimensions. The flat pattern was cut out by hand including a small hole made at its center 94, and placed on the same ball bearing and using the ball bearing as a male die, it was pressed into a piece of cupped metal, or female die, and a bald shape was established for the pattern. Then on checking the contours, it was found to make a pattern for a perfect cutting blade for cutting spherical dies. The pattern was then flattened out, and used for making a template, which in turn is used for making an indefinite number of blade blanks of suitable metal such as cutlery steel, by any conventional means. Then, "right hand" and "left hand" blades are made from the blanks by placing them on one side or the other between a male semispherical die and a cupped female die, the male die having a small center finger to extend through the center hole 94 in the blank into a complementary recess in the female die, to thus center the blank between the male and female dies, and provide perfect semispherical blade blanks, properly centered, needing only spot welding to cap 78 and then sharpening to make any number of identical mirror image pairs of cutter blades for this invention. These blades 76 are interchangeable with any model or size of melon ball cutting machine.

The upper and lower pneumatic motors 90 are each fixedly mounted on an upper and lower pair of commercially available pneumatic or air cylinders 108, the piston rods 110 of upper cylinders 108 being fixedly secured by nuts 112 to an upper oval shaped subbase 114, which upper subbase 114 is detachably secured by ball lock pins 116 to columns 118 fixed on machine base 12, the lower pair of cylinders 108 being similarly mounted on a similar subbase machine base 12 (not shown). Both machine base 12 and subbase 114 having openings through which the pneumatic motors 90 may extend or advance and retract.

Figure 4:
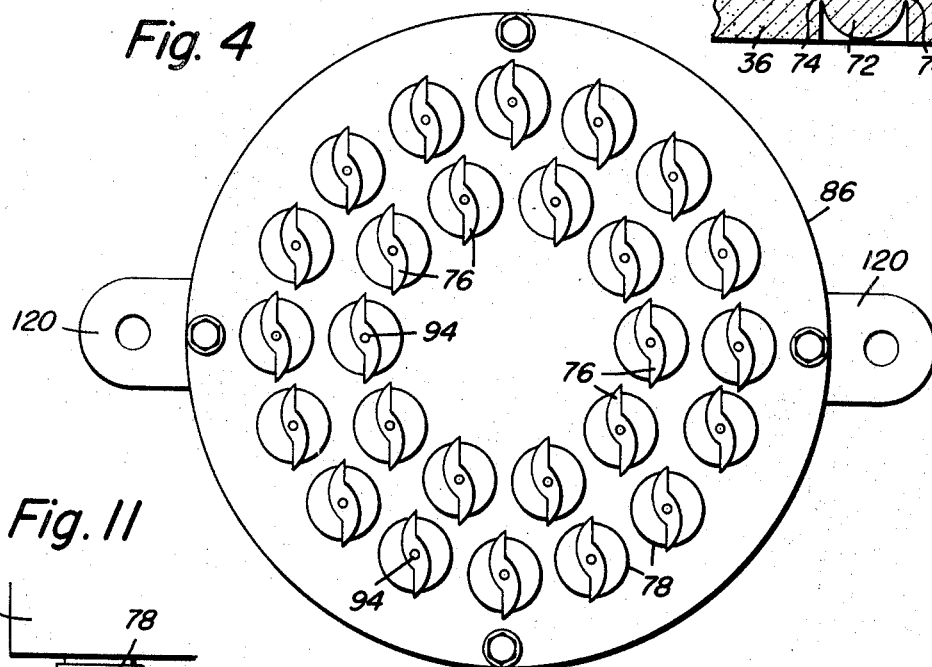
FIG. 4 is a bottom plan view of the cutter shown in FIG. 3.
Figure 11:
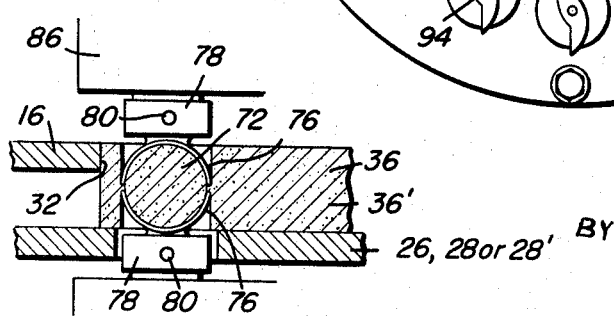
FIG. 11 is a fragmentary view of a melon ball in the process of being cut.
Figure 5:
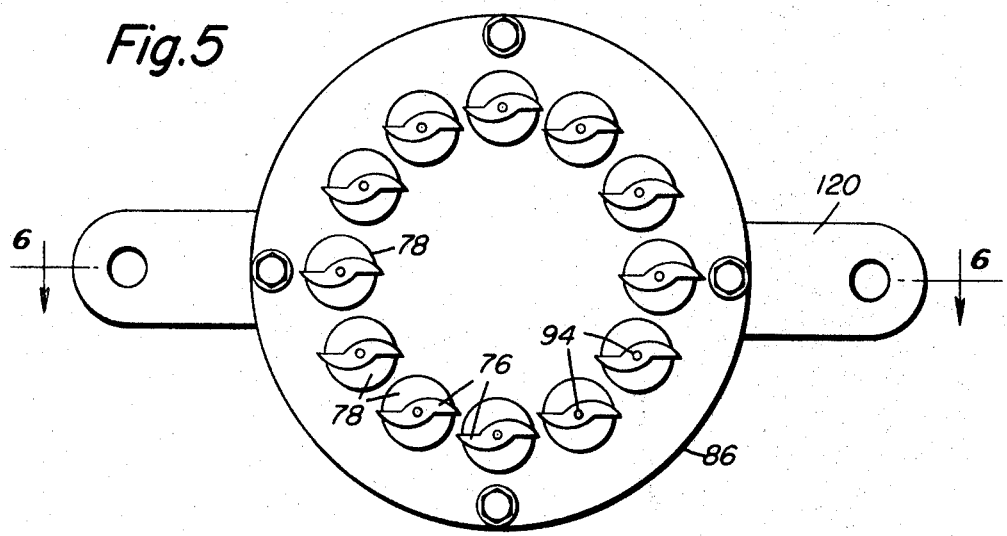
FIG. 5 is a view similar to FIG. 4, with but a single circle of cutter blades.
Figure 6:
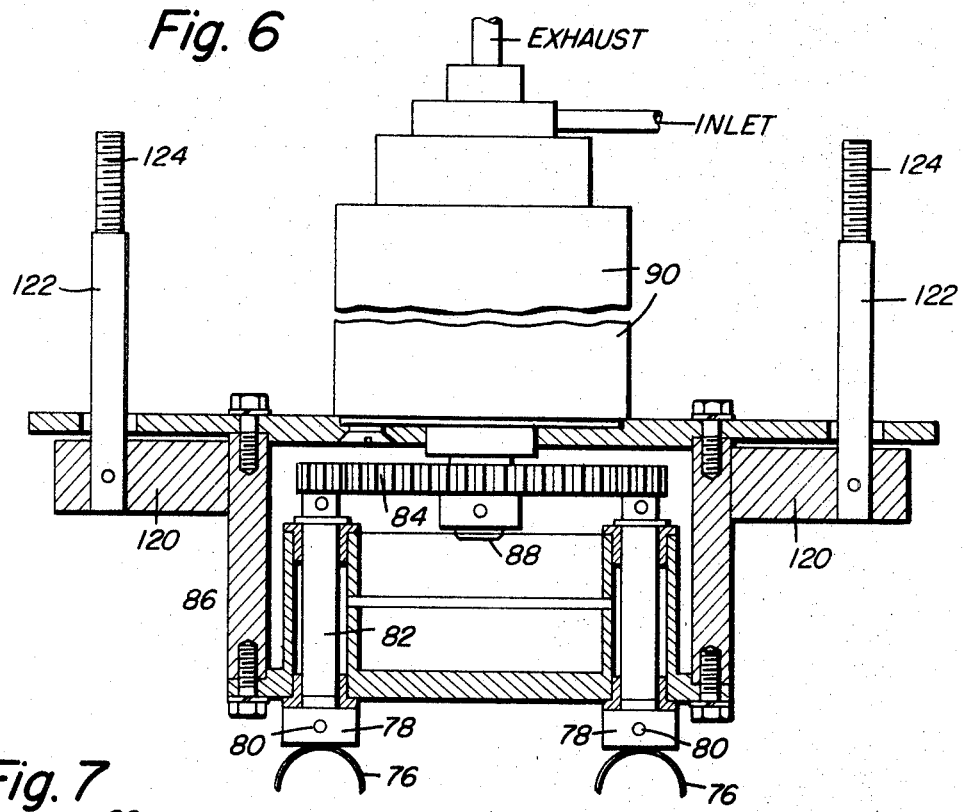
FIG. 6 is a vertical sectional view on line 6—6 of FIG. 5.

The pneumatic cylinders 108 are double acting with built in variable speed controls and cushioned ends, and the motors 90 likewise have built in variable speed controls. Bosses 120 extending from gear housing or cutter head 86 have stop limit rods 122 pinned at one end thereto, the other ends being threaded at 124 for adjustable nuts 126 cooperating with sleeves 128 on subbase 114 to adjustably limit the advance of the motor 90 and thus of the opposed blades 76 toward each other to leave the pulp web 74 to hold the balls 72 in the slices 36. The pattern of the blades 76 shown in FIGS. 3 and 4 is identical with the pattern of holes 28 of the feed plates 24 of FIG. 9, the pattern of the blades 76 shown in FIGS. 5 and 6 is identical with the pattern of holes 30 of the feed plate 26 shown in FIG. 10, and the lower motor 90 moving upwardly in extend or advance direction moves its set of blades 76 up through the pattern of holes 28 in the feed plate and into the melon slice 36, while the upper pneumatic motor 90 and its set of rotating blades extend or advance down so that the opposed pair of blades of each set cut or form a melon ball 72 but are stopped short of each other thus leaving the pulp web 74 about each melon ball 72. At the same time, a finger 130 contacts lower limit switch 132, which, through the circuit and pneumatic system hereinafter described, stops the rotation of the blades, causes the pneumatic or air cylinders 108 to retract both the pneumatic or air pressure operated motors 90 and their opposed sets of blades 76 until the finger 130 contacts the upper limit switch 134, which stops and then holds the motors and blades in retracted position, and initiates actuation of the rotary work feed table 14 to rotate one eighth of a revolution, removing the melon slice 36 with its cut melon balls 72 from between the opposed sets of retracted blades 76, and places a new melon slice in position to be cut. Inasmuch as the melon slices are graded up to one half inch variation in diameter, the small ones will fit more loosely in the feed table recesses 32 than others, but the spring biased clips 38 urge the slices outwardly toward the guide fence 56. At the cutting station, the melon slice 36 to be cut contacts the similar spring biased clip 68, in guide fence 56, and the three clips 38, 68 and 38 center the melon slice over the pattern of holes, ready for cutting.

When the rotary work feed table has rotated one eighth of a revolution, it actuates a limit switch therewith which then causes the pneumatic cylinders 108 to start a new cutting cycle, automatically advancing the blades toward cutting position, meanwhile also activating the pneumatic motors to rotate the cutting blades as they advance to cutting position. The cycle repeats indefinitely, as long as the pneumatic power and electric power is fed to the motors, cylinders and controls, and as long as new slices of melon 36 are fed into the star wheel recesses 32 over the feed table, and the cut melon slices 36 are discharged at the discharge end 70 of the feed plate 24, the cycling being entirely automatic, and its speed of operation being controllable by proper manipulation of the pneumatic controls, one operator may feed and control a reasonable number of machines simultaneously.

The invention as thus far described discloses the machine for automatically feeding slices of melon of the honeydew or cantaloupe type to the cutting station, holding them there while being cut, and then moving them on to a discharge station. In this type of of melon, the seeds are located in a central area, and the slices are cut in the shape of rings, which, after being washed or sprayed free of any loose seeds and loose pulp, are graded as to size within half inch limits, and then fed to the star wheel 16 of the appropriate size machine, with a pattern of one or two annuli of holes and cutting blades.

The principles of this invention are generally applicable to watermelons, except that such a watermelon machine 10' is semi-automatic, there is no star wheel, but the watermelon slices, in the form of disks, must be fed manually to the cutting station, and then after being automatically ejected partly from the cutting station, must be manually removed to the discharge station. Also, the pattern of holes and blades must be conformed to the pattern of clear pulp in a watermelon slice. In one type of watermelon slice, there is a clear area of pulp at the center and eight seed free areas extending radially outwardly to the circumference, with a seeded area extending between each pair of outwardly extending clear areas. Other types of watermelon have more or less numbers of seed free areas. With a selected size of watermelon of this type it is possible to cut a total of twenty-four watermelon balls in one cutting operation, arranged eight opposed pairs of cutters in a pattern for the seed free clear center area of the slice, in a circle, and two additional rings of eight pairs of opposed rings surrounding the center set and extending outwardly to cut watermelon balls from the eight outwardly or radially extending seed free areas. With an even larger size of watermelon a greater number of rings of balls may be available, and the machine will be built accordingly.

Obviously, a watermelon ball cutting machine with a different pattern of cutters and holes is provided to coordinate with a type of watermelon having a different pattern of seed free areas.

Primed reference numerals are used in the following description of the watermelon ball cutting machine 10' where the construction and operation are identical or similar. The machine base 12' and upper subbase 114' each support the pneumatic cylinders 108' and their attached penumatic rotary motor 90' with a suitable gear train in the gear housing or cutter head 86' for automatically controlled advance or extend and retract movement of their opposed cutting blades 76' into a watermelon slice (in the form of a disk) 36'. The upper subbase 114' is D-shaped as shown, and detachably supported on four columns 118' and held thereon by half lock pins 116'. No star wheel or rotary work feed table or semicircular feed plate is provided in this watermelon ball cutting machine 10', instead a manual somewhat rectangular feed plate 136 is provided having a semicircular extension 138 midway of one rectangular side. A pattern of three circular rows of holes 28' is provided with the holes 28' of each row extending in a radius outwardly to thus correspond with the natural pattern of seed free pulp in a watermelon slice or disk 36' and the blades 76' are of course in the same pattern. The long side of rectangular feed plate 136 is provided with a fence bar 140, the straight portions of the other side each have a fence bar 142, and the semicircular extension 138 has two separated curved fence bars 144, there being a space 146 between curved fence bars in which is located an ejector angle plate 148 fixed on the end of a piston rod 150 extending from a piston 152 operated within commercially available double acting penumatic or air cylinders 154 having built-in speed controls and cushion ends, similar to air cylinders 108 and 108'.

Also connected to ejector plate 148 is an ejector limit switch rod 156 having a finger 158 which is moved thereby between ejecting or outer limit switch 160 and retracting or inner limit switch 162. Just as the limit switches 132 and 134 and finger 130 coordinate with the movement of motors 90 and cylinders 108, so do the limit switches 132' and 134' and finger 130' coordinate with the movement of the motors 90' and cylinders 108' to operate and energize ejector limit switches 160 and 162 to cause operation of the ejector air cylinder 154, to cause ejector plate 148 to eject the cut watermelon slice after the blades 76' have completed their cutting and have been fully retracted, and the cycle is automatically ended. When the cycle is stopped, the operator removes the cut slice 36' to one side to discharge it from one open end of feed plate 136, and then feeds a fresh, uncut slice 36' to the cutting station over 138 using the index marks 170 on plate 136 to coordinate the seed free areas 172 of watermelon slice 36' with the pattern of the blades 76'. To then start the next cycle, the operator must use both hands to simultaneously press two spaced apart momentary contact push buttons 164, on opposite sides of the machine 10' to thus insure that his hands are not in danger from the rotating blades 76'.

Figure 17:
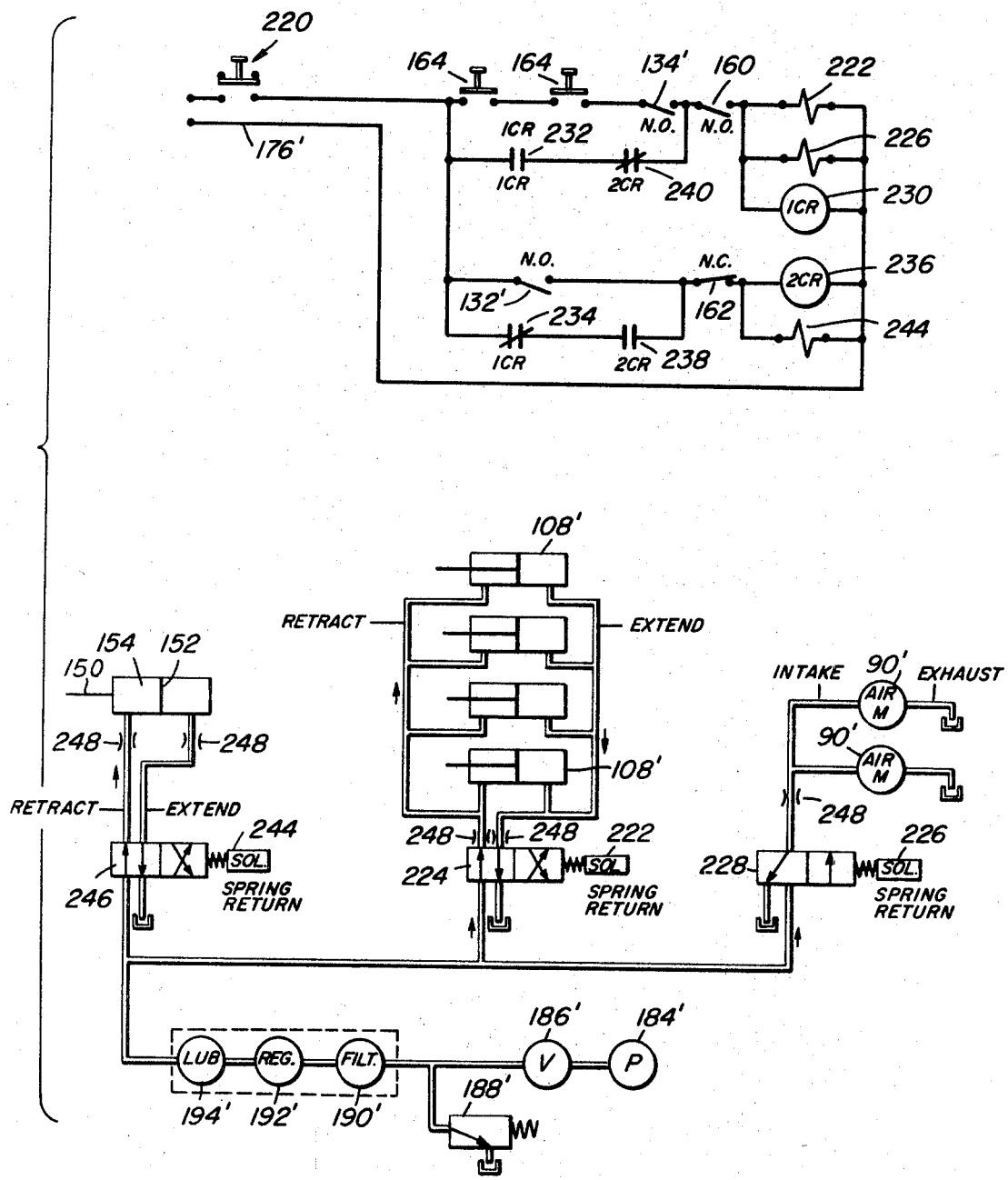
FIG. 17 is an electric and a pneumatic diagram for the watermelon ball cutting machine.

The electrical and pneumatic circuits are shown diagrammatically in FIGS. 14 and 17. For the automatic honeydew melon ball cutting machine of FIGS. 1 to 10 and FIG. 17, and the semiautomatic watermelon ball cutting machine of FIGS. 15 and 16, and the circuits of FIG. 17 when the same parts appear in both sets of diagrams, the same reference number, with a prime added, is generally used to show the identity of the part in the second set of drawings and diagrams with the first set of drawings and diagrams.

In sequence No. 1 after a main switch 174 is closed in a 110 volt powerline 176, the current flows through a low voltage transformer (8–12 volt) 178, of conventional construction, forming part of the rotary work feed table 14. The low voltage current then flows through contacts "1" and "2" of commercially provided terminal block 180 to energize the solenoid valve 182. Upper limit switch 134 is held closed by finger 130 when the cutter blades 76 are in the retracted position. The contact 184 in relay 208 is closed when relay 208 is de-energized. Solenoid valve 182 and normally open switch 202 as well as the terminal block 180 are component parts of the commercially available rotary work feed table 14.

In the pneumatic piping, air pressure pump 186 supplies air through pressure control valve 187, and if necessary, through excess pressure relief valve 188, on through air filter 190, regulator 192 and lubricator 194 to solenoid valves 182, 196, and 198. As solenoid valve 182 is actuated in the electrical circuit, the valve 182 shifts to permit the air or pneumatic cylinder 200, forming part of the rotary work feed table 14, to retract, and the internal poppet valve of solenoid valve 182 of rotary work feed table 14 trips and rotates the star wheel 16. After the star wheel 16 rotates to the next position, then the normally open switch 202 (mounted inside rotary feed table 14) is tripped to close the switch 202 for sequence No. 2 (the ball cutting operation).

At the same time that sequence No. 1, the operation of rotating the star wheel 16, is occurring, the air supply continues on through solenoid valve 196 which permits air pressure to hold the air cylinders 108 in the retract position, the cutting blades 76 being thus held in fully retracted position, and as the air continues on to solenoid valve 198, the air supply is cut off from the air motors 90, thus stopping rotation of blades 76.

In sequence No. 2, the operation of cutting the melon balls, after the star wheel 16 is rotated to position and has tripped normally open switch 202, the high voltage circuit 176 is used. When normally open switch 202 is closed, current flows from main power switch 176 through closed switch 204, through contacts numbers "7" and "8" of terminal block 180, through normally open switch 202 (inside the rotary feed table 14) to upper and lower limit normally open limit lower and upper switches 132 and 133, then simultaneously solenoid valves 204 and 206 relay 208 (ICR) are energized.

Solenoid valve 204 controls the air motors 90 and solenoid valve 206 controls the air cylinders 108. Upper limit switches 133 and 134 are normally open but are held closed by the gear housing or cutter head 86 while the cutting blades 76 are in retracted position (being thus held by air cylinders 108 in sequence 1). When relay 208 is energized, then contact 210 (ICR) is closed to complete the circuit after upper limit switch 133 opens. Also, relay 208 opens relay contacts 184 and 212 (ICR) in the low voltage circuit to prevent the star wheel 16 from rotating and the high voltage line to prevent the air cylinders 108 from retracting, thus providing an interlock or safety device.

In sequence No. 2, pneumatic, when solenoid 204 and 206 are actuated, the following occurs. Solenoid 204 on valve 198 permits air to operate both air motors 90, one rotating left hand and one rotating right hand, depending on which cutting head gear housing 86 the blades 76 are mounted (the motor rotation can be reversed by switching the inlet hose to either the "right" inlet port or the "left" inlet port). Solenoid 206 on valve 196 permits the air to advance or extend all four cylinders 108 thus forcing the upper and lower cutting heads or gear housings 86 into cutting position. (Note: when the current is cut off from solenoid 206 of valve 196 and solenoid 204 of valve 198, the spring return will shift both valves 196 and 198 back to their normal positions thus retracting the cutter heads or gear housings 86 and shutting off the air motors 90.)

In electrical sequence No. 3, when the cutter heads 86 are both at full advance cutting position, lower limit switch 132 permits high voltage currents to pass therethrough. This energized relay (2CR) 214 which opens contact (2CR) 216 to interrupt the circuit to the upper limit switch 133. Also relay 214 closes contact (2CR) 218 to hold the circuit while lower limit switch 132 opens as the cutting heads 86 are retracted. When the cutting heads 86 are fully retracted the heads 86 close the normally open limit switch 134, thus resetting the circuit for sequence 1. Thus the cycle is complete, and the sequencing continues automatically until the machine is stopped by opening main switch 174.

In the pneumatic sequence No. 3, when the lower limit switch 132 is closed by the cutting head 86 at the full cutting position, the relay 214 opens contact 216 thus breaking the circuit to relay 208 which opens contact 210 and also removes the current from solenoids 204 and 206. When solenoid 204 is de-energized, then valve 198 is spring returned to its normal position thus stopping air motors 90. When solenoid 206 is de-energized, then valve 196 is spring returned to its normal position, thus retracting air cylinders 108 and retracting the cutter heads 86. After full retraction of the cutter head, the limit switch 134 is closed, thus resetting the circuit for sequence No. 1.

As to switch 205, if at any time during the operation of sequence No. 1, there happens to be a power failure or their line is disrupted, then the internal ratchet of the rotary work feed table 14 may engage the wrong tooth of the ratchet gear therein. This would in effect throw the star wheel 16 out of phase or sequence and the cutters would be damaged upon interference with the star wheel 16. To control this situation, manually operable switch 205 is provided to "jog" the star wheel 16 into proper phase or position. As switch 205 is first moved, it breaks the high voltage circuit thus rendering the cylinder and motor circuits inoperable. As the switch 205 is then further moved to close the low voltage circuit, solenoid valve 182 is energized to rotate the star wheel 16. Also, the popper valve (mounted on the rotary work feed table 14) can be triggered to further provide "joggin" to the star wheel 16.

In the semi-automatic watermelon ball cutting machine shown in FIGS. 15 and 16, the electric and pneumatic diagrams are both shown in FIG. 17.

In electric sequence No. 1 for this watermelon ball cutting machine, the system is first electrically powered by closing starting switch button 220. Then after placing a watermelon slice 36' in proper manually indexed position in accordance with the index marks 170, the two widely spaced apart momentary contact buttons 164 are pushed, one by each hand, thus making it impossible to start the cycle unless both hands of the operator are safely distant from the advancing, rotating cutter blades 76'. Upper limit switch 134', normally open, is held closed by the upper cutter gear housing or head 86' through its finger 130' when it is in the full retract position as shown in FIG. 15. Limit switch (outer) 160, normally open, is held closed by ejector limit switch rod 156 and operating finger 158 while the ejector plate 148 is held in full retract position. When switches 164, 134' and 160 are in closed position, then solenoid 222 is energized to cause valve 224 to permit cutter head air cylinders 108' to extend the air motors 90' and the cutting blades 76' to extend for cutting into the pulp or meat of the watermelon slice 36'. At the same time, solenoid 226 is energized to cause valve 228 to permit air motors 90' to operate and turn cutter blades 76'. Also at this time, relay 230 is energized to close contact 232 (1CR) to hold the circuit after limit switch 134' is opened as the cutter head 86' moves away and the operator releases buttons 164. The relay 230 also opens contact 234 to break the circuit for cutter head 86' to retract.

In the pneumatic sequence No. 1, for the watermelon ball cutting machine, solenoid 222 is energized, then valve 224 which is held in position to keep cylinders 108' retracted, shifts to permit the air to extend or advance the cylinders 108' and this moves the cutting heads 86' into cutting position. At the same time, solenoid 226 is energized, then valve 228, which is held in closed position to keep the motors 90' from turning the cutting blades 76', shifts and permits air to turn the motors 90' and rotate the cutting blades 76'.

In electrical sequence No. 2, for the watermelon ball cutting machines, when the cutting heads 86' reach the full, pre-set, cutting depth, the following occurs. (1) Lower limit switch 132', which is normally open, closes. (2) Inner ejector limit switch 162 is normally closed. (3) Relay 236 (2CR) is energized and contact 238 (2CR) is closed to hold the circuit when lower limit switch 132' opens as the cutting head retracts direction. At the same time contact 240 (2CR) opens and interrupts the extend circuit shutting off the advance of the cylinders 108', the air motors 90' and relay 230, which permits contact 234 (1CR) to close and assisting in holding the cutting head retract circuit. Also, at this time, solenoid 244 is energized which permits valve 246 to shift and extend the ejector air cylinder 154. As air cylinder 154 moves, it opens outer ejector limit switch 160, thus rendering the cutting head extend circuit inoperative.

As the cutting head 86' retracts fully it closes upper limit switch 134'. When the ejector air cylinder 154 reaches full eject position, it opens inner limit switch 162, which is normally closed, and breaks the circuit and de-energizes solenoid 244, and its spring return valve 246 shifts and permits the ejector air cylinder 154 to retract. At the same time, relay 236 is de-energized and contact 238 opens and contact 240 closes. When the ejector air cylinder 154 is fully retracted, it closes outer ejector limit switch 160, and thus the system is reset to sequence No. 1.

In pneumatic sequence No. 2, for the watermelon ball cutting machine, (1) when relay 236 is energized, it breaks the extend motor drive circuit and de-energizes solenoid 222, which permits valve 224 to shift automatically back to retract air cylinders 108', also solenoid 226, which permits its valve 228 to shift back and shut off the motors 90'.

(2) When solenoid 244 is energized, its valve 246 shifts and permits air to extend eject air cylinder 154. As eject air cylinder 154 extends to the full position, eject limit switch 162 opens and de-energizes solenoid 244, permitting valve 246 to shift back and permits air to retract the eject air cylinder 154, thus resetting the system for sequence No. 1. It will be noted that manual operation of buttons 164 is necessary after the watermelon slice 36′ has been manually indexed in the cutting position, and thus, this watermelon ball cutting machine is semi-automatic, while the honeydew melon ball cutting machine is automatic, and runs continually, while the melon slices 36 are fed manually to the star wheel 16, until the power is cut off.

A variable flow control valve 248 is provided in the air line from valve 246 to the eject air cylinder 154 to slow down and control the speed of the ejector plate 148 so that the cutter blades 76′ can retract and allow the watermelon slice 36′ to be ejected after the cutter blades 76′ are retracted therefrom.

A diagram of the commercially available, 2-way, normally closed, single solenoid, pilot operated valve, lock type, is shown in FIG. 18. This is the valve 228 and solenoid 226 which controls air motors 90′, and also the valve 198 and solenoid 204 which controls the motors 90. This valve is normally closed, and opens when energized. A conventional speed control valve is also included in this pneumatic circuit for controlling the speed of the air motors 90 and 90′.

A diagram of the commercially available 4-way, single solenoid pilot-operated valve, lock type with a manual-over-ride is shown in FIG. 19. It also has a speed control valve in the pneumatic circuit. In de-energized position, A is normally open to pressure P of the air cylinders 108 or 108′ or 154. Position B is open to exhaust E. In energized position, B is open to pressure P the air cylinders 108 or 108′ or 154, and position A is open to exhaust E.

The air motors 90 and 90′ are of type shown in U.S. Pat. Nos. 2,979,037; 2,984,223; and 2,990,814, and also in The Gardner-Denver Handbook of Air Motor Power, Bulletin 70-AM-1 of Nov. 30, 1962 by Gardner-Denver Company, of Quincy, Ill., particularly air motor 70A-26, .6 h.p. described and illustrated on pages 13, 14 and 15.

The air cylinders 108, 108′ and 154 are of the type shown in U.S. Pat. Nos. 3,027,877 and 3,033,169, and Model MNC-151-10 Bellows-Valvair, generally illustrated on page 7 of Bulletin EP-64, by Bellows-Valvair division of IBEC of Akron 9, Ohio. Others of the commercially available items used in this invention, such as the oil filters, lubricator, solenoid valves, etc, are listed in this same bulletin. The rotary work feed table 14 is of the type shown generally in Pat. Nos. 2,968,973 and 3,085,452, and also Bellows-Valvair bulletin RT-1022R model BRET-10C, on pages 7 to 11 inclusive.

Obviously, any other equivalent commercially available items may be used in place of these mentioned.

The commercially available solenoid valves, transformers, relays, electrical switches, control valves, air filters, regulators and others referred to and shown only diagrammatically are generally located in the control panel assembly box 250 shown in FIG. 2 except where they are part of a commercially furnished item, such as in the rotary work feed table 14, etc. Speed control valves for the air motors and air cylinders are conventionally provided as part of these commercially available items and are located thereon in a conventional manner, and suitable connection of the pressure lines thereto determine the direction of rotation of their motors as desired. Many commercially available items are used in this invention. The essence of this invention, is as defined in the claims, and is generally in the novel combinations of parts, the forming of the balls by cutting them from opposite sides of the melon slice, the particular details of and method of forming the cutting blades, the automatic operation of the honeydew melon ball cutting machine, the semi-automatic and safe operation of the watermelon ball cutting machine.

The term "ball" as used in this specification and claims is not restricted to a perfect sphere, but also encompasses spheroids, ovoids, or any shape capable of being generated by revolution of appropriately shaped cutting blades, wherein the object has a maximum circular transverse cross section, and adjoining sides which may recede therefrom and the maximum circular cross section is not necessarily located at the midpoint between its top and bottom ends.

Although this invention has been described in considerable detail, such description is intended as being illustrative rather than limiting, since the invention may be variously embodied.

Abstract of the drawing

In the drawings, like numbers refer to like parts, and for the purposes of explication, marshalled below are the numbered parts of the improved Melon Ball Cutting Machine.

10, 10′, melon ball machine
12, 12′, base
14, 14′, commercial rotary work fee table
16, star wheel
18, rotary fee table shaft
20, nut on 18
22, fixedly mounted horizontally disposed table
24, semicircular feedtable (double annuli pattern)
26, semicircular feedtable (single annulus pattern)
28, 28′, multiple annuli pattern holes
30, single pattern holes
32, star wheel slice receiving recesses
34, star points
36, 36′, melon slice
38, clips in 32
40, fingers of 38
42, web of 38
44, countersinks in 32 for web 42 of clips 38
46, pivot pin for clip 38
48, slot in fingers 40 of clips 38
50, fixed pin in 48
52, spring biasing clip 38 outwardly
54, countersunk hole for 52
56, guide fence
58, guide fence securing studs
60, tapered ends of guide fence 56
62, feed throat
64, extreme end of fence 56
66, guide cheek
68, clip on 56, identical with 38
70, discharge end of guide fence 56
72, melon balls
74, melon pulp web
76, 76′, semispherical cutting blade
78, cutting blade cap
80, pins detachably securing cap 78 to blade rotary shaft 82
82, blade rotary shaft
84, gear train operated by rotary shaft 88 of pneumatic motor 90
86, 86′, gear housing or cutter head
88, rotary shaft of motor 90
90, 90′, pneumatic rotary motor
92, spot welding blade 92 to cap 78 about center point 94
94, axial center point of blade 76 and cap 78 and blade rotary shaft 88
96, diametrically aligned cutting edges of semispherical blade 76
98, outer points of cutting edges 96
100, inner ends of edges 96
102, curved cutting edges from 100 to foremost point 104
104, foremost cutting point on 102
106, unsharpened curved continuation edge from 104 to point 98
108, 108′, pneumatic cylinders
110, piston rod of cylinders 108

112, nut securing rod 110 to sub-base or base
114, 114', upper sub-base
116, pins detachably securing columns 118 to sub-base 114'
118, 118', columns supporting sub-base 114
120, boss on gear housing 86
122, adjustable stop limit rods
124, thread on end of 122
126, adjusting nuts on 124
128, cooperating sleeves for rod 122 and nut 126
130, 130', limit switch operating finger
132, 132', lower limit switch
133, upper limit switch
134, 134', upper limit switch
136, rectangular feed plate
138, semicircular extension on rect. feed plate 136
140, long side fence bar
142, short side two fence bars
144, two curved fence bars
146, ejector plate space between ends of 144
148, ejector plate
150, ejector plate piston rod
152, ejector piston
154, ejector air cylinder
156, ejector limit switch rod
158, ejector limit switch operating finger
160, outer ejector limit switch
162, inner ejector limit switch
164, two spaced apart momentary contact push buttons
170, watermelon slice index marks on plate 136
172, seed free area of watermelon slices 76'
174, main power high voltage line switch
176, 110-volt power line
178, 8–12 volt transformer
180, commercially available terminal block
182, solenoid pilot valve for rotary work feed table relay contact
186, air pressure providing pump
187, pressure control valve
188, excess pressure relief valve
190, air filter
192, pressure regulator
194, lubricator
196, solenoid valve for air cylinders 108
198, solenoid valve for air motors 90
200, air cylinder (of rotary work feed table 14)
202, normally open switch (inside rotary feed table 14)
204, solenoid for valve 198 to air motors 90
205, jog switch for star wheel 16
206, solenoid for valve 196 to air cylinders 108
208, relay
210, contact
212, relay contact
214, relay
216, contact
218, contact
220, watermelon ball cutting machine starting switch button
222, solenoid for valve 224 to cylinders 108'
224, valve for cylinder 108'
226, solenoid for valve 228
228, valve for air motors 90'
230, relay
232, contact
234, contact
236, relay
238, contact
240, contact
242, contact
244, solenoid for valve 246
246, valve for eject air cylinder 154
248, variable flow control valve for eject air cylinder 154
250, control panel assembly box Having thus set forth and disclosed the nature of this invention, what is claimed is:

1. A machine for cutting balls from melons or like objects comprising a horizontally disposed table, a pair of vertically opposed rotary pneumatic motors, a rotary gear train operatively connected to each pneumatic motor, a set of somewhat semispherical cutting blades operatively connected to each gear train for simultaneous rotation thereby, the blades of each motor being located in paired, opposed relation with the blades of the other motor, the opposed blades of each pair rotating in the same direction, pneumatic means for advancing and retracting each set of blades toward and away from the other set of blades, means limiting the advance of each set of blades toward each other to a juxtaposed but slightly spaced position from each other and then activating said pneumatic means to retract said blades from each other, means for holding a slice of the object being cut on said table in the path of and between the opposed blades of said rotating pairs of blades when said opposed blades are being advanced toward each other, said horizontally disposed table having a plurality of apertures therethrough indexed to correspond with the indexing of said pairs of blades to permit one set of blades to advance therethrough to ball cutting position when the slice is supported thereover by said horizontally disposed table and held there by said holding means.

2. The machine of claim 1, and means activating said pneumtic motors while said blades are being advanced, and limit means deactivating said pneumatic motors when said blades are being retracted.

3. The machine of claim 1, said slice holding means comprising a plate having a concave edge for receiving the slice therein.

4. The machine of claim 3, and means in said concave edge of said plate for at least partially ejecting the slice therefrom after the balls have been cut therein.

5. The machine of claim 3, said slice holding plate being mounted on said horizontally disposed table.

6. The machine of claim 1, said slice holding means comprising a star wheel mounted on said horizontally disposed table, said wheel having a slice receiving concave edge between each pair of star points.

7. The machine of claim 6, and means for intermittently rotating said star shaped wheel in indexed relationship to the retraction of said sets of blades to index a new slice between said sets of cutter blades.

8. The machine of claim 7, and a guide fence on said horizontal table cooperating with said star shaped wheel to hold and guide the slices therein while being rotated to and from the cutting position.

9. The machine of claim 8, and outwardly biasing means on said guide fence and also on the concave recess edge of said star wheel biased toward and centering a melon slice therebetween.

10. The machine of claim 1, the blades of each pair being semispherical mirror images of each other, each blade being pivoted at its center point, each blade having diametrically aligned, oppositely extending cutting edges, straight in plan view, spaced from said center point, and an edge, curved in plan view, extending from the inner spaced end of each said straight cutting edge to the outer end of the other said straight cutting edge, each said curved edge being sharpened from its said end coinciding with the inner end of said straight blade to at least the foremost point thereon which advances in a rotating direction.

11. The machine of claim 10, and means for operatively connecting each blade to its said gear train comprising a shaft geared to its said gear train, said shaft having an end extending away from said gear train, a cap to which said blade is secured, and means for securing said cap on said shaft end.

12. The machine of claim 1, the blades of said set being in a pattern corresponding to readily usable area of the slice.

13. The machine of claim 12, said pattern being an annulus.

14. The machine of claim 12, said pattern being two concentric annuli.

15. The pattern of claim 12, said pattern being in the form of a star haivng a central area and a plurality of radially extending fingers.

16. The machine of claim 1, said blade set pneumatic advancing and retracting means comprising a pair of pneumatic cylinders fixedly supported relative to said horizontal table for each said pneumatically operated motor, each said pneumatic motor being mounted on its said pair of pneumatic cylinders for advancing toward and retracting from said horizontally disposed table.

17. The machine of claim 16, said slice holding means comprising a star shaped wheel on said horizontally disposed table, said star shaped wheel having a slice receiving concave edge between each pair of star points, a rotary feed table on which said star shaped wheel is operatively mounted, a pneumatic motor operatively connected to said rotary feed table, and electrical circuitry cycling the operation of said rotary feed table pneumatic motor, said blade rotating pneumatic motors, and said pneumatic cylinders, to intermittently rotate said star wheel, to actuate said pneumatic cylinders into advancing operation and simultaneously actuate said pneumatic motor into blade rotating cutting action, to then limit advance of said pneumatic cylinders and stop said blade rotating action, then retract said pneumatic cylinders and blades and then repeat the cycle.

18. In a ball cutting machine, a pair of mirror image, partly spherical, ball cutting blades, each blade being pivoted at its center point, each blade having diametrically aligned, oppositely extending cutting edges, straight in plan view, spaced from said center point, and an edge, curved in plan view, extending from the inner spaced end of each said straight cutting edge to the outer end of the other said straight cutting edge, each said curved edge being sharpened from its said end coinciding with the inner end of said straight blade to at least the foremost point thereon which advances in a rotating direction.

19. A machine for making melon balls comprising a frame, means on said frame for advancing a melon portion from a receiving station through an operating station to a discharging station, means on said frame at said operating station for moving toward and away from opposite sides of a melon portion thereat, a pair of mirror image, partly spherical, ball cutting knives, means for mounting said cutting rotating knives on said moving means to face each other and for rotation about a common axis, means for rotating said knives, and means on said frame for moving said moving means toward each other until said knives nearly touch and then away from each other.

20. A machine as in claim 19, and including means on said frame for operating said advancing means and said moving means alternately.

21. A machine for making melon balls comprising a frame, a base plate on said frame and having an opening therein, an indexing wheel, means for mounting said indexing wheel on said frame for rotation relative to said base plate, a guide bar, means for mounting said guide bar on said base plate to define a path at least partly around the periphery of said indexing wheel and over said opening, a pair of cutter heads, means for mounting said cutter heads on said frame for movement toward and away from said base plate on a common axis, a pair of cutting knives, means for mounting each of said cutting knives on a respective one of said cutter heads to face each other and for rotation about an axis common to said pair of cutting knives, means for rotating said cutting knives, means on said frame for moving said cutter heads with one of said knives moving through said opening, means on said frame for rotating said indexing wheel, and means for alternately operating said cutter head moving means and said indexing wheel rotating means.

22. A machine for making melon balls comprising a frame, a base plate on said frame and having an opening therein, means on said frame for establishing a path on said base plate extending over said opening, a pair of cutter heads, a pair of mirror image, partly spherical, ball cutting knives, means for mounting one of said knives on a respective one of said cutter heads to face each other and for rotation about a common axis extending through said opening, means on said cutter heads for rotating said cutting knives, and means on said frame for moving said cutter heads toward and away from each other with at least one of said rotating knives passing through said opening.

23. A machine for making melon balls as in claim 22, including means on said frame for limiting the movement of said cutter heads toward each other.

24. A machine for making melon balls comprising a frame, a horizontal base plate on said frame and having an opening therein, an indexing wheel having a peripheral scallop, means for mounting said indexing wheel on said frame for rotation above said base plate about an axis to move said scallop from a receiving station through an operating station to a discharging station, a guide bar, means for mounting said guide bar on said frame to establish a path around the periphery of said indexing wheel from said receiving station through said operating station over said opening to said discharging station, means on said frame for rotating said indexing wheel, a pair of cutter heads, means for mounting said cutter heads on said frame for movement toward and away from each other in a direction parallel to said axis, a pair of knives, means for mounting each of said cutter knives on a respective one of said cutter heads facing each other and for rotation about a common axis parallel to said axis and extending through said opening, and means on said cutter heads for rotating said cutter knives.

25. A machine for making melon balls as in claim 24 and including means on said indexing wheel and on said guide bar for holding a melon ring in said scallop against said base plate.

26. A machine for making melon balls as in claim 25 and including means on said indexing wheel for centering a melon ring in said scallop.

References Cited

UNITED STATES PATENTS

| | | |
|---|---|---|
| 855,901 | 6/1907 | McMaster. |
| 1,478,441 | 12/1923 | Leveque _ _ _ _ _ _ _ _ _ _ _ _ 83—51 |

W. GRAYDON ABERCROMBIE, Primary Examiner